E. P. Carett,
Circular Saw Mill.
N° 19,128.  Patented Jan. 19, 1858.
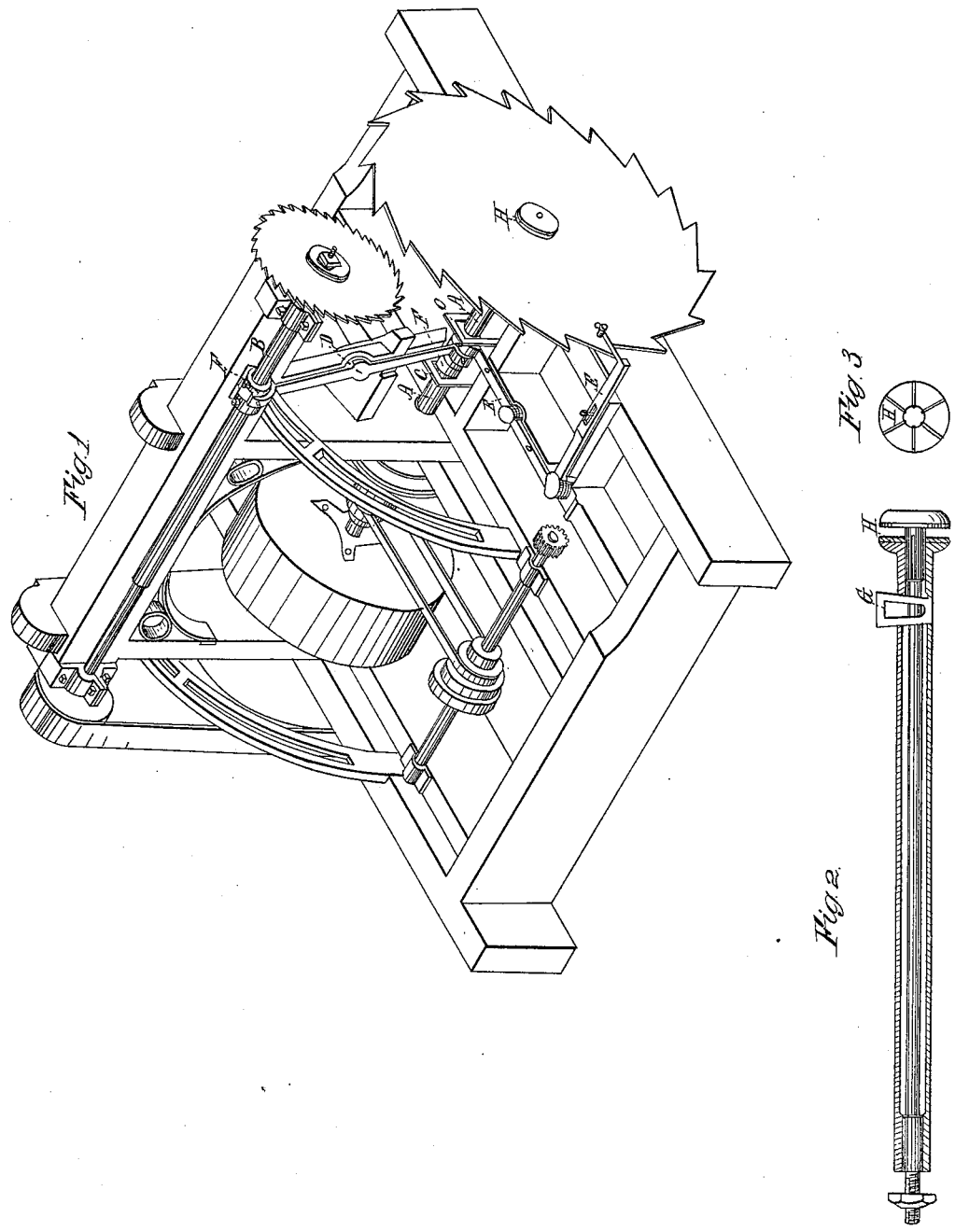

UNITED STATES PATENT OFFICE.

EDWIN P. CAVETT, OF ST. LOUIS, MISSOURI.

DEVICE FOR ADJUSTING TWO CIRCULAR SAWS TO THE SAME PLANE IN SAWING LUMBER.

Specification of Letters Patent No. 19,128, dated January 19, 1858.

*To all whom it may concern:*

Be it known that I, EDWIN P. CAVETT, of the city of St. Louis and State of Missouri, have invented certain new and useful Improvements in Circular-Saw Mills; and I do hereby declare that the following is a full, clear, and exact description of the same, reference being had to the annexed drawing, making part of this specification, in which—
Figure 1 is a perspective view; Fig. 2, a longitudinal section through saw mandrel, and Fig. 3 are metallic collars for securing the saw.

The nature of my invention consists in the application of a compound lever to the two saw arbors of a double circular saw mill, whereby the lateral motion of one saw will automatically govern the lateral motion of the other, and also in combining the saw arbor with a hollow mandrel and an air funnel in such a manner as to cause a current of air to pass in around the saw arbor and out against the sides of the saw, the object of which is to keep the saw cool. These improvements are designed to attach to any of the ordinary circular saw mills.

The frame of my mill being of the ordinary construction, I shall not describe it, but confine myself to illustrating the improvements.

The devices and their combination which constitute my invention are as follows.

Similar letters represent corresponding parts on the different figures.

A is lower saw mandrel, B upper saw mandrel, C C springs to guide said mandrels, D compound lever, E E compound lever and cross bar to guide periphery of saw, G air funnel, H H Babbitt or other nonconducting metal collars to prevent the heat from passing from saw to journal and from journal to saw, *a a* fulcrums of the two simple levers composing the compound lever D.

It is considered absolutely necessary that a circular saw (when used to saw large logs) should have what is termed "end play," so that in case the log vibrates or the saw strikes a knot, or indeed if any lateral stress be brought against the saw, it can accommodate itself to such stress or motion and continue on its course without injury. The springs C C serve as yielding to hold the saw steady, and in a given position, so long as it is unobstructed by any lateral obstruction. But in case such obstruction appears, the springs are designed to yield, so as to allow the saw to pass the obstruction, and at the same time to gently urge it back to its original position. Now when a double mill is used, if each saw arbor be provided with "end play" and has its separate spring, the one saw can move laterally without reference to the other, so that the "gaps" cut by the respective saws will not match—that is the "gap" cut by the lower saw will sometimes be half an inch farther to the right or left, as the case may be, than the "gap" cut by the upper one, whereby the lumber is injured to a great extent and often rendered unsalable.

One of the objects of my invention is to overcome the difficulty above pointed out, which I propose to do by the application of the compound lever D, to the two saw mandrels. This compound lever is composed of two simple ones which are joined together at D by means of a working joint, and each of the simple levers has its fulcrum at *a a*. The two simple levers being thus compounded in one, the opposite ends of the compound lever are connected to the upper and lower saw arbors, by reason of which if one saw be moved laterally in either direction the other saw will be moved a like distance in the same direction, whereby the two saws will be made to cut their respective "gaps" directly opposite each other.
In hanging a circular saw it is necessary to place the journal box as near the saw as possible so that there will be no vibration of the arbor when the saw is cutting, and to provide still further against the vibration of the saw it is necessary to keep the journal box screwed up on the journal, so that there will not be the least vertical play in the box. In consequence of this necessity the journals frequently become heated, and being close to the saw the heat is conducted to it to such an extent as to draw the temper and render it unfit for use, and in case there are many knots in the logs or in case the logs vibrate considerably the saw becomes highly heated, and by the approximate position of the journals they are also heated by conduction from the saw, whereby the journals are often destroyed. These objections I propose to overcome by passing a current of air through the saw arbor, and cause it to escape against the side of the saw and thus keep it cool.

Fig. 2 shows a hollow mandrel with the saw arbor reaching entirely through it. The said arbor is made to fit the hole in the mandrel at each end only, the diameter of the intervening length being made considerably smaller than the hole in the mandrel, so that an open space will be left between the mandrel and the arbor. One end of the saw arbor is made with a collar on it as shown at H, and on the other end a screw nut is placed, whereby the saw is secured between the two collars H H. In the mandrel at G an air receiver is placed, and in the end of the saw arbor at b, small longitudinal grooves are cut, and the inside of the two collars shown at H H are fluted, so that the mandrel in revolving causes the air to pass in at the funnel G and out through the small grooves b and fluted collars H H, against the sides of the saw, whereby it is kept cool. The two collars H H are made of, or lined with, some known nonconducting metal, such as Babbitt metal for instance, so that the heat of the journal cannot be conducted to the saw or the heat of the saw to the journal.

I lay no claim to the "end play," but one of my improvements is for the government of the end play automatically. Neither do I lay any claim to the springs or their arrangement. Neither do I claim the compound lever D as such, but

What I claim as new and as my invention is—

1. The application of the compound lever D to the two saw arbors, substantially in the manner described, whereby the lateral motion of one saw will automatically govern the lateral motion of the other as set forth.

2. And I also claim the combination of the saw arbor with the hollow mandrel, and the air funnel G whereby a current of air is made to pass through the arbor against the sides of the saw, substantially in the manner set forth.

EDWIN P. CAVETT.

Witnesses:
 JOHN JOHNSTON,
 ROBERT McDONALD.